May 21, 1968 W. HAUSER-BUCHER 3,383,930
HYDRAULIC RECIPROCATING ENGINE
Filed Nov. 23, 1965
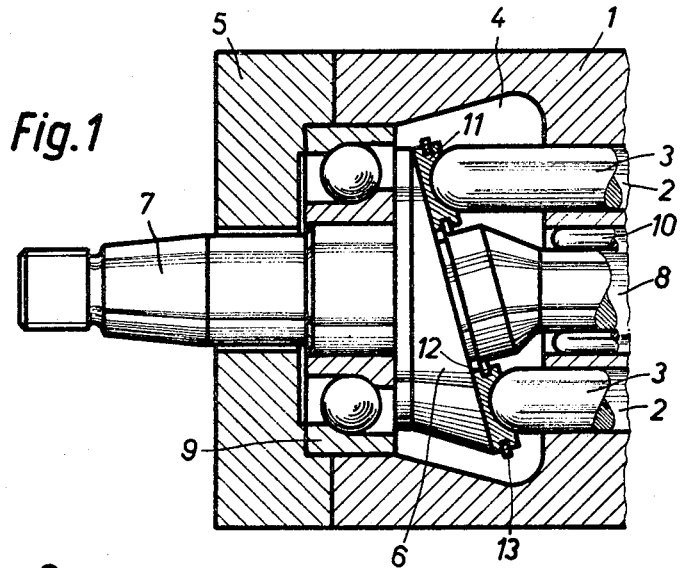
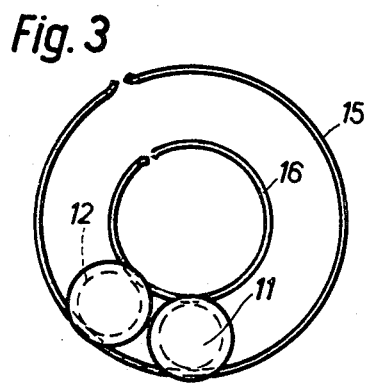
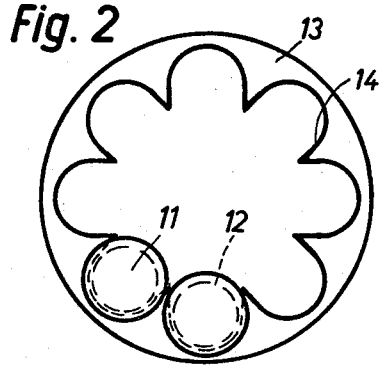
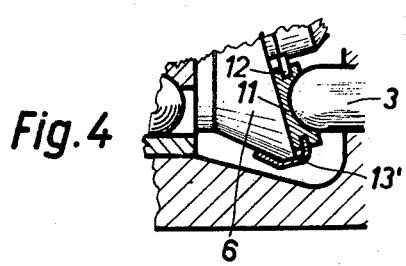
INVENTOR
WALTER HAUSER-BUCHER
By
OSTROLENK, FABER, GERB & SOFFEN
ATTORNEYS

United States Patent Office 3,383,930
Patented May 21, 1968

3,383,930
HYDRAULIC RECIPROCATING ENGINE
Walter Hauser-Bucher, Zurich, Switzerland, assignor to Bucher-Guyer A.-G. Maschinenfabrik Niederweningen, Zurich, Switzerland
Filed Nov. 23, 1965, Ser. No. 509,275
Claims priority, application Switzerland, Nov. 23, 1964, 15,058/64
3 Claims. (Cl. 74—60)

ABSTRACT OF THE DISCLOSURE

A hydraulic reciprocating engine is disclosed including a shaft, a cam member connected to the shaft with the cam member having a planar bearing surface oriented angularly relative to the longitudinal axis of the shaft. A plurality of pistons reciprocate along axes parallel to the shaft axis and a plurality of pressure pads is interposed between respective ones of the pistons and the planar bearing surface of the cam member. A resilient holding means in the form of a pair of concentric rings is provided to secure the pads together as a unit and at the same time permit the pads to move radially with respect to the planar bearing surface as the cam member rotates.

---

The invention relates to a hydraulic reciprocating engine, of which the working pistons bear, through pressure pads, against a member customarily in the form of a tapered disk.

In order to reduce the very high pressures upon the tapered disk that otherwise would arise should the working pistons directly contact the disk, easily replaceable pressure pads are normally located between the disk and the hemispherical ends of the pistons. The life of the disk, which is generally produced with the power shaft as a unitary piece, is thereby substantially increased.

Although the working pistons customarily are pressed, by the working fluid, against the tapered disk during each part of the work cycle, under certain unfavorable conditions the contact can be interrupted and one of the pressure pads allowed to fall out of place. Obviously, the engine then does not function normally, and the pressure pad flying freely about the chamber containing the tapered disk can damage or entirely destroy the latter.

An object of the invention is the provision, in a hydraulic reciprocating engine, of a cage for holding the pressure pads in place at all times.

Another object of the invention is such a cage that permits the pressure pads to execute an elliptical path during operation of the engine.

A further object of the invention is a cage that provides play between each pressure pad and that portion of the cage holding the pad.

An additional object of the invention is a cage made of an elastomer, such as natural or synthetic rubber.

Another object of the invention is a cage that is secured to the member borne upon by the working pistons and connected to the shaft.

An additional object of the invention is a cage comprised of two resilient rings.

These and further objects will be apparent from the following detailed description, with reference to the drawings, wherein:

FIGURE 1 is a longitudinal view, partly in section, of one end of the hydraulic reciprocating engine;

FIGURES 2 and 3 are top views of two embodiments of the cage of the invention;

FIGURE 4 is a longitudinal view, partly in section, showing the connection between the cage and the tapered disk of a further embodiment of the invention.

Referring to FIGURE 1, the portion of the reciprocating engine shown includes a cylinder head 1 having a plurality of bores 2 for receiving the working pistons 3. The chamber 4, located at one end of the head 1, is closed by a front cover plate 5. A member, in the form of a tapered disk 6, located within the chamber, is here constructed, together with the shaft 7, as a unitary piece. The shaft, which, in accordance as to whether the engine is used as a pump or as a motor, is either a drive shaft or a power take-off shaft, is supported in a central bore 8 of the head 1 and in a ball bearing race 9, which latter in part takes support from the head 1 and in part from the plate 5. The race is capable of bearing both radial and axial forces. Roller or needle bearings 10 support the shaft in the bore 8.

A pressure pad 11, in the shape of a disk, is located between each hemispherical end of the piston 3 and the tapered disk 6. One side of a pressure pad has a hemispherical depression that receives the end of the piston, whereas the opposite side is ground flat. Each pressure pad has an annular slot 12 which receives a spacer or cage 13.

The cage 13 is so designed that it permits a relative radial movement between the pressure pads and the tapered disk, occasioned by the elliptical path described by the pressure pads.

FIGURE 2 illustrates a disk-shaped cage 13 having hemispherical openings 14 for receiving the pressure pads 11.

In a unitary metallic cage of this kind, there exists a lateral play between each pressure pad 11 and the corresponding opening 14, thus permitting the above-noted relative movement. To this end, as visible in FIGURE 2, the radius of the openings 14 is made greater than that of the slots 12.

FIGURE 3 shows a cage formed of two spring rings 15 and 16 that engage the annular slot 12 of the pressure pads. Inasmuch as the flexible rings 15, 16 of themselves permit the relative movement, no lateral play need be provided. In this embodiment, ring 16 can be dispensed with some loss in reliability of operation.

The cage 13' of FIGURE 4, rigidly mounted on the tapered disk 6, offers still greater reliability. It has, however, the disadvantage that some power is lost because of the friction that necessarily arises, in consequence of this construction, in the annular slot 12. Moreover, its construction is relatively expensive, because the portion of the spacer that grips the tapered disk does not take the same shape over its entire circumference.

The cage, with its openings 14, can also be made as a disk of an elastomeric material, such as a synthetic or natural rubber.

The invention is not limited to a member 6 of a special shape, since the invention obviously can be employed or adapted to be employed, without exceeding its scope, to such members of various cross sectional forms.

I claim:
1. In combination:
a hydraulic reciprocating engine including a shaft;

a cam member connected to said shaft, said cam member having a planar bearing surface oriented angularly relative to the longitudinal axis of said shaft;

a plurality of pistons reciprocally movable along axes parallel to the longitudinal axis of said shaft;

and a plurality of pressure pads interposed between respective ones of said pistons and said planar bearing surface; and resilient holding means for securing said pads together as a unit and for permitting said pads to move radially with respect to said planar bearing surface as said cam member rotates.

2. The combination of claim 1, wherein said resilient holding means comprises first and second concentric resilient rings lying in a common plane which is parallel to the planar bearing surface of said cam member, and said first and second rings define an annular channel therebetween within which said pads are trapped.

3. The combination of claim 2, wherein said pads have side slots located about their circumferential surfaces, said slots being received by said first and second rings.

References Cited

UNITED STATES PATENTS

| | | | |
|---|---|---|---|
| 2,093,477 | 9/1937 | Parsons | 74—60 X |
| 3,011,452 | 12/1961 | Budzich | 103—173 |
| 3,183,848 | 5/1965 | Raymond | 74—60 X |
| 3,240,159 | 3/1966 | Andrews et al. | 103—162 |
| 3,246,577 | 4/1966 | MacIntosh | 74—60 |
| 3,295,459 | 1/1967 | Griffith | 103—161 |

FOREIGN PATENTS

| | | |
|---|---|---|
| 989,240 | 4/1965 | Great Britain. |
| 1,004,628 | 9/1965 | Great Britain. |
| 1,269,286 | 7/1961 | France. |

FRED C. MATTERN, JR., *Primary Examiner.*

CORNELIUS J. HUSAR, MARTIN P. SCHWADRON, *Examiners.*